United States Patent [19]

O'Mullan et al.

[11] 3,762,113

[45] Oct. 2, 1973

[54] MOLDED PLASTIC LANDSCAPE EDGING AND BORDER STRUCTURE

[76] Inventors: Norman P. O'Mullan, 412 Essex Ave., Bloomfield; Paul A. Zamarra, Jr., Lake Rd., Far Hills, both of N.J.

[22] Filed: July 13, 1972

[21] Appl. No.: 271,561

[52] U.S. Cl. ................ 52/102, 47/33, 52/582, 52/314, 404/7
[51] Int. Cl. ................................ E01c 11/22
[58] Field of Search ............ 52/102, 311, 316, 52/582, 287, 314; 404/7, 54; 47/33

[56] References Cited
UNITED STATES PATENTS

| | | | |
|---|---|---|---|
| 3,491,660 | 1/1970 | Kwasney | 47/33 X |
| 348,598 | 9/1886 | Strickland | 52/102 |
| 2,282,559 | 5/1942 | Byers | 52/102 |
| 2,912,792 | 11/1959 | Venable | 47/33 |
| 3,277,624 | 10/1966 | Cornell | 52/DIG. 8 |
| 3,415,013 | 12/1968 | Galbraith | 47/33 X |
| 3,520,082 | 7/1970 | Smith | 404/7 X |
| 3,561,181 | 2/1971 | Bassett | 52/316 |

FOREIGN PATENTS OR APPLICATIONS

| | | | |
|---|---|---|---|
| 1,048 | 1/1894 | Great Britain | 47/33 |
| 331,594 | 11/1935 | Italy | 404/7 |

*Primary Examiner*—Alfred C. Perham
*Attorney*—Anthony F. Cuoco

[57] ABSTRACT

A molded plastic landscape edging and border structure includes modules having blocks and mortar joints, said modules being coupled to each other end to end. The modules may carry stakes which anchor the structure in the ground and the structure is installed on or below the ground line. For heavy duty use, the modules have a base member which is laid in a bed of wet road material such as asphalt or cement so that when the material is dry the base is fixedly secured thereto.

19 Claims, 20 Drawing Figures

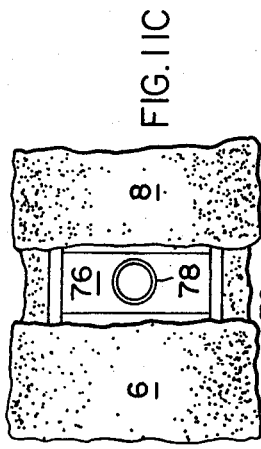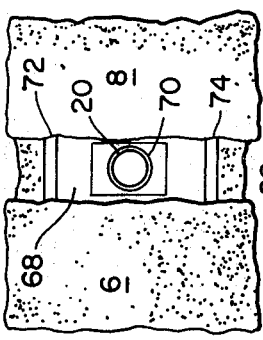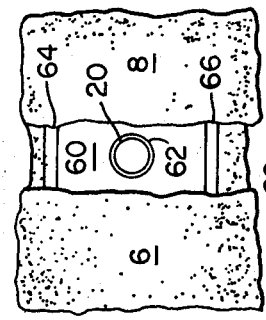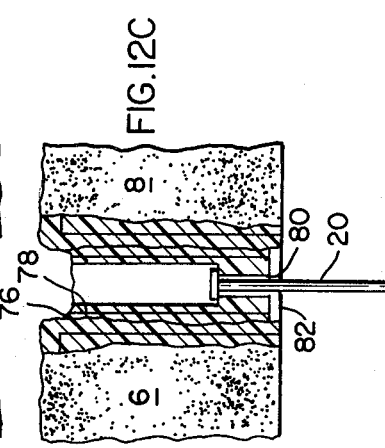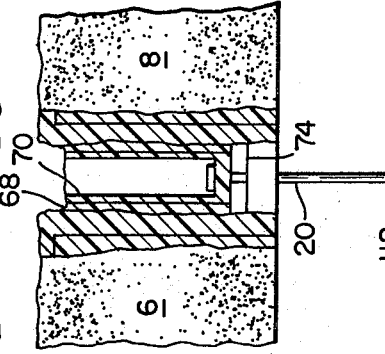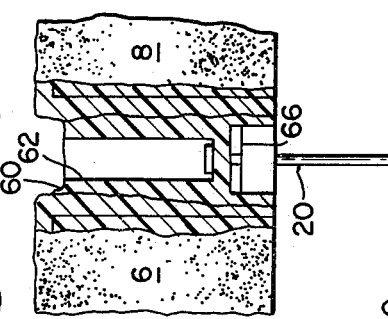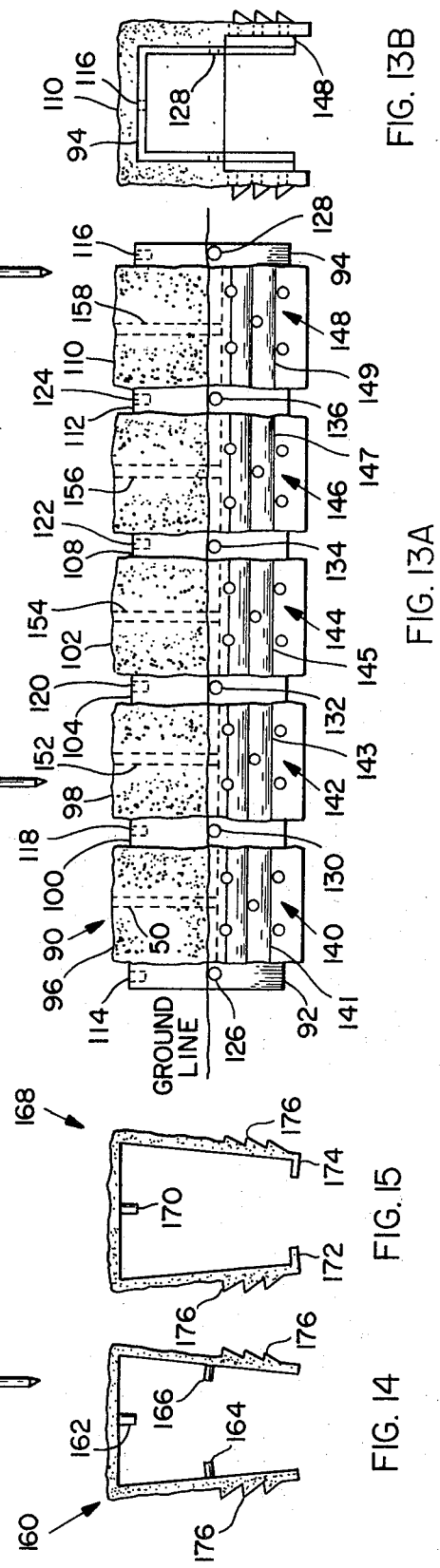

MOLDED PLASTIC LANDSCAPE EDGING AND BORDER STRUCTURE

BACKGROUND OF THE INVENTION

1. Field of the Invention

This invention relates generally to landscaping and particularly to edging and border structures used in landscaping. More particularly, this invention relates to molded plastic landscape edging and border structures which simulate masonry structures in texture and appearance, but are more economical to provide and easier to install.

2. Description of the Prior Art

Modern land and home owners are particularly conscious of the asthetic quality of their property. Proprietors of service stations and the like are becoming increasingly aware of the appearance of their establishments. Suburban shopping centers and industrial complexes are being designed to blend in with their surroundings. In short, landscaping is now a major part of every building effort.

Commensurate with the increased emphasis on landscaping has been the need for edging and border structures. These structures are widely used for bordering driveways, edging gardens and floral areas and setting off walks and paths. Heretofore, such structures were made of natural stone or brick or some other suitable masonry material. These materials are not only costly, but require skilled effort for proper installation. The present invention, while closely simulating the masonry materials, in color, texture and appearance is economical to manufacture and easy to install.

SUMMARY OF THE INVENTION

This invention contemplates a molded plastic landscape edging and border structure of the type described. In one embodiment of the invention the structure includes molded modules having block members separated by molded mortar joints. The modules are coupled to each other at their ends, with molded mortar joints being arranged for locking the coupled modules together. The blocks and molded mortar joints are arranged so that the structure is installed on or below the ground line and the connecting members may carry stakes for anchoring the structure in the ground. In another embodiment of the invention the modules have an extended base which is laid in a bed of wet road material. The road material flows into recesses and adheres to surations in the base so that when the material is dry the base is fixedly secured thereto.

One object of this invention is to provide a landscape edging and border structure, including molded plastic modules coupled to each other at their ends.

Another object of this invention is to provide the modules so that they include a plurality of block members separated by molded mortar joints.

Another object of this invention is to arrange the ends of the modules so that said modules may be coupled to each other at said ends.

Another object of this invention is to arrange molded mortar joints so that they are effective for locking the coupled modules together.

Another object of this invention is to arrange the molded modules and molded mortar joints so that the structure may be installed on or below the ground line.

Another object of this invention is to arrange the modules so that they may be fixedly secured to road material, with the structure being thereby applicable for heavy duty use.

Another object of this invention is to provide a landscape edging and border unit of the type described which is economical to provide and easy to install.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes and are not to be construed as defining the limits of the invention.

DESCRIPTION OF THE DRAWINGS

FIGS. 11A, 11B and 11C are top views showing alternate arrangements of connecting members for retaining anchoring stakes according to the invention.

FIGS. 12A, 12B and 12C are partially sectioned front views corresponding to the top views of FIGS. 11A, 11B and 11C, respectively.

FIG. 13A is a front view showing an embodiment of the invention wherein the modules are arranged for heavy duty use.

FIG. 13B is an end view corresponding to the front view of FIG. 13A.

FIGS. 14 and 15 are end views showing alternate molded plastic mortar joints for use in the embodiment of the invention shown in FIGS. 13A and 13B.

DESCRIPTION OF THE INVENTION

Figure 1:
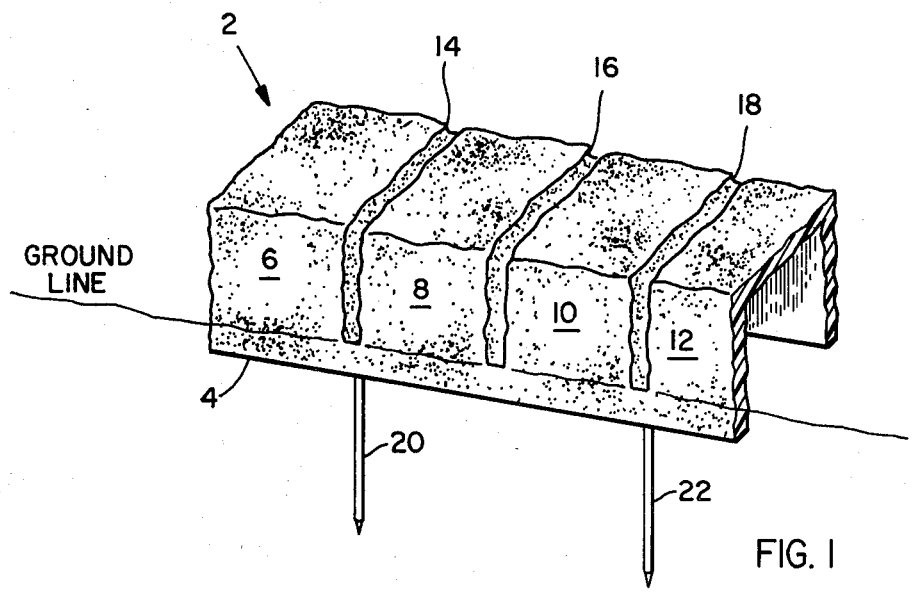
FIG. 1 is a isometric pictorial representation showing the elements of the invention arranged for installation below the ground line.

With reference first to FIG. 1, a molded plastic module 2 according to the invention includes a base 4 having a plurality of block members shown for purposes of illustration as four in number and designated by the numerals 6, 8, 10 and 12. Blocks 6 and 8 are separated by a molded plastic mortar joint 14, blocks 8 and 10 are separated by a molded plastic mortar joint 16 and blocks 10 and 12 are separated by a molded plastic mortar joint 18. Steel spikes or stakes 20 and 22 are supported by module 2 as will be hereinafter explained and extend therefrom fro suitable anchoring the module in the ground.

Base 4 and mortar joints 14, 16 and 18 are molded of a suitable high impact thermoplastic material such as polyvinylchloride or polyethylene. Base 4 is a rigid open bottomed member as shown in the figure. Molded mortar joints 14, 16 and 18 are inverted U-shaped members whose sides extend at either acute or obtuse angles from their base and are deflectable away from or toward each other as the case may be. In either event, the molded mortar joints are assembled astride the base with their sides exerting a sufficient force to retain the joints on the base in snap-in fashion as will be hereinafter explained.

Figure 2:
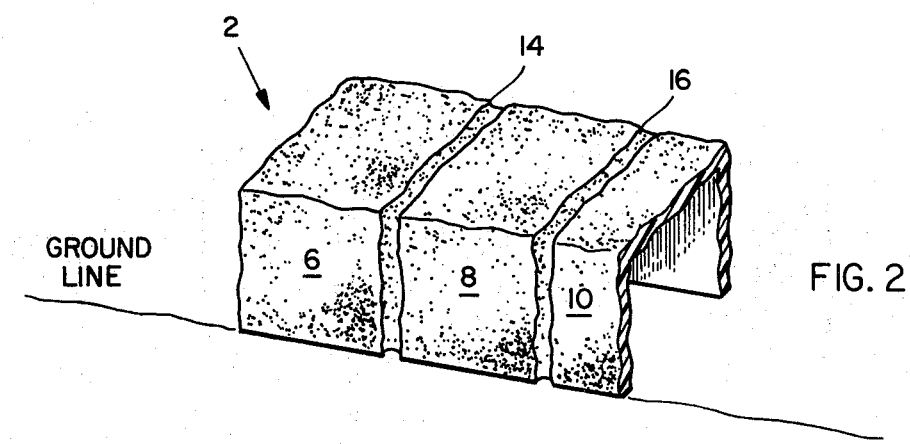
FIG. 2 is an isometric pictorial representation showing the elements of the invention arranged for installation on the ground line.

FIG. 1 shows molded mortar joints 14, 16 and 18 extending nearly to the bottom of base 4 for installation of molded module 2 below the ground line while FIG. 2 shows the mortar joints extending to the bottom of the base for installation of the module on the ground line. The feature of the invention whereby installation may be below or on the ground line will be more fully described with reference to FIGS. 4 and 5.

Figure 3:
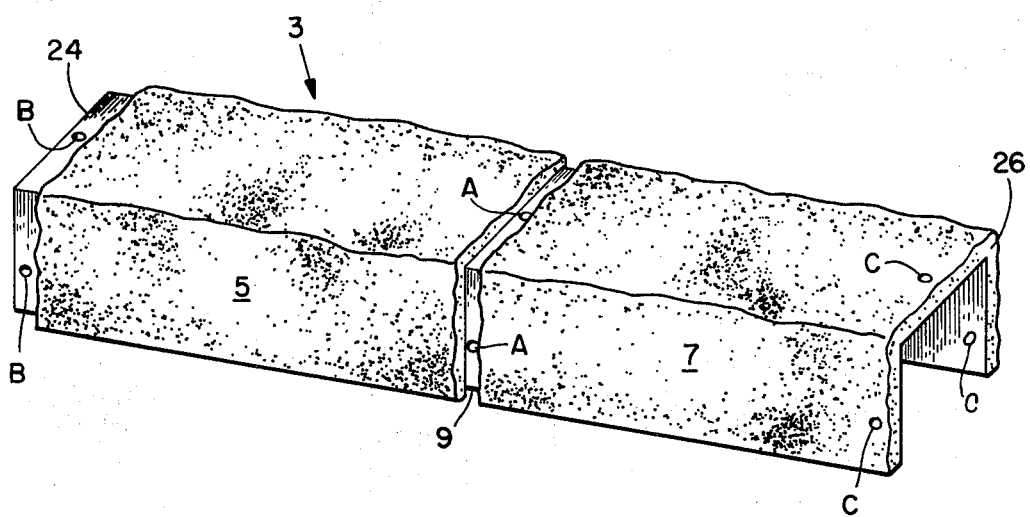
FIG. 3 is an isometric pictorial representation of the invention showing molded plastic module having a block connecting member and module end sections according to the invention as shown in FIGS. 1 and 2.

FIG. 3 shows a form of the invention wherein a molded module 3 has blocks 5 and 7 connected by a member 9, with blocks 6 and 8, 8 and 10 and 10 and 12 in FIGS. 1 and 2 being connected by similar members. As will be described with reference to FIGS. 4 and 5, mortar joints such as the molded mortar joints 14, 16 and 18 in FIGS. 1 and 2 snap on connecting members 9 to provide the complete module. Further, the connecting members are arranged to retain stakes such as the stakes 20 and 22 shown in FIG. 1, with alternate arrangements therefor being shown in FIGS. 11A–11C and 12A–12C.

FIG. 3 shows generally the feature of the invention wherein one end of the molded module, such as the end 24, is in male configuration and the other end, such as the end 26, is in female configuration so that modules may be joined end to end to provide the structure of the invention. In this event the molded mortar joints are arranged astride the joined ends to lock the modules together as will be explained with reference to FIG. 6. Connecting member 9 carries holes A, end 24 carries holes B and end 26 carries holes C for locking purposes which will hereinafter become evident.

The size of the modules and the number and size of the blocks therein is not intended to be limited by the representation of FIGS. 1–3, said representations being for illustration purposes only. Indeed, it is within the scope of the invention that each module have only a single block with said blocks being joined end to end to form the structure of the invention as will hereinafter become evident.

The features of the invention which have been described generally with reference to FIGS. 1, 2 and 3 will now be more specifically described with reference to FIGS. 4, 5 and 6.

Figure 4:
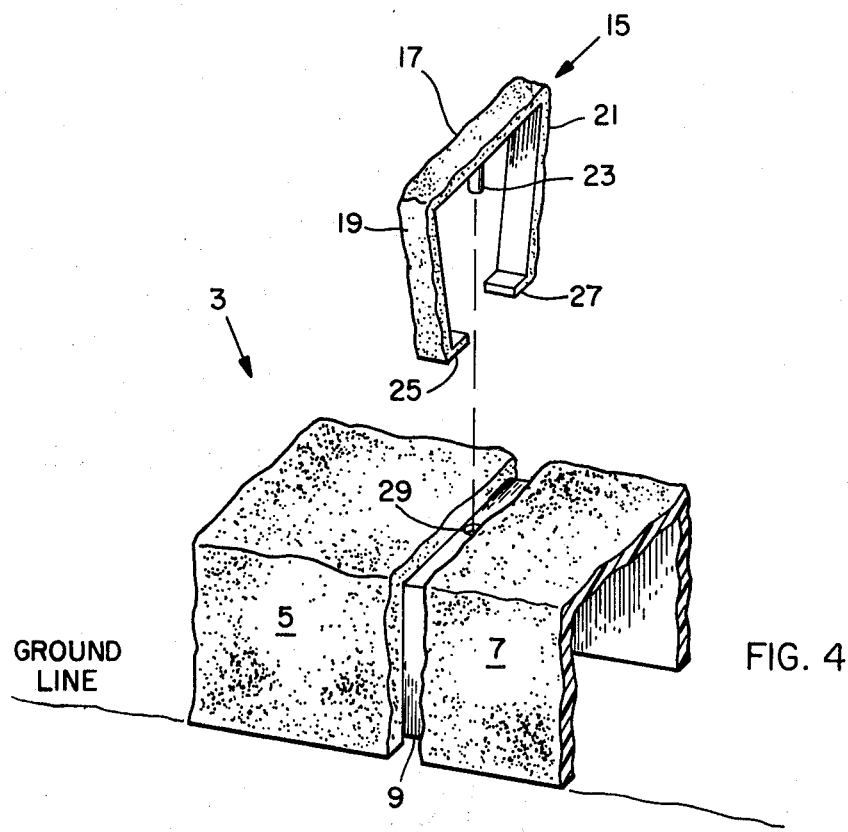
FIG. 4 is an isometric pictorial representation showing a block, connecting member and molded plastic mortar joint assembly arranged for installation on the ground line.

Thus, FIG. 4 shows module 3 having blocks 5 and 7 connected by member 9. The size of connecting member 9 in relation to that of the blocks is such that when a molded mortar joint 15 is assembled astride the connecting member it will fill the space between the blocks so as to give the appearance of a masonry unit as will now be understood.

To this end, molded mortar joint 15, as heretofore noted, is of a generally inverted U-shape and includes a base 17 and legs 19 and 21 which extend at an acute angle from the base. Base 17 carries a centrally disposed pin or dowell 23 and the ends of legs 19 and 21 have lips 25 and 27 which are substantially normal to the respective legs.

In order to assembly molded mortar joint 15 to molded module 3, legs 19 and 21 are manually urged apart and the molded mortar joint is positioned astride connecting member 9. Upon releasing the legs, they snap back against the sides of the connecting member, with lips 25 and 27 hooking under said member which terminates just above the bottom of blocks 5 and 7 as shown in the figure. Pin 23 on molded mortar joint 15 engages a hole 19 on the top surface of connecting member 9, whereupon the molded mortar joint is virtually locked on the connecting member as is now evident.

The embodiment of the invention shown in FIG. 4 is for installation on the ground line as therein illustrated, and whereby the molded mortar joint extends to the bottom of the blocks. Such an installation is advantageous where excavation is not desired and heavy duty use is not intended, which may be the case for "do-it-yourself" home use and the like.

Figure 5:
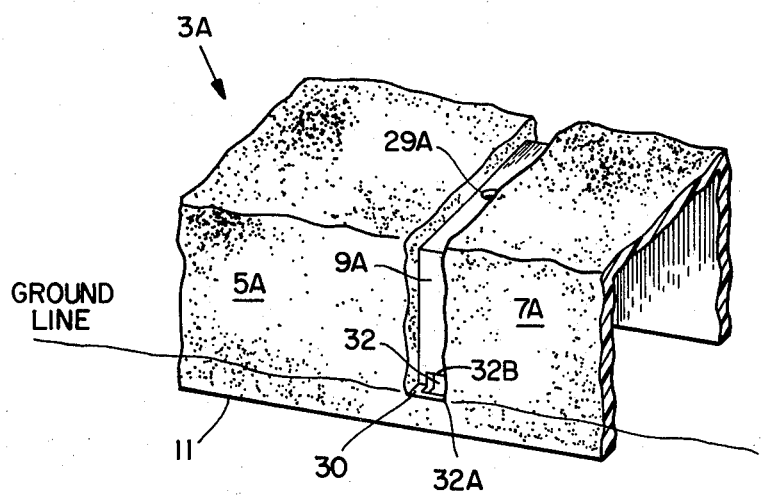
FIG. 5 is an isometric pictorial representation showing a block and connecting member arranged for installation below the ground line.
Figure 6:
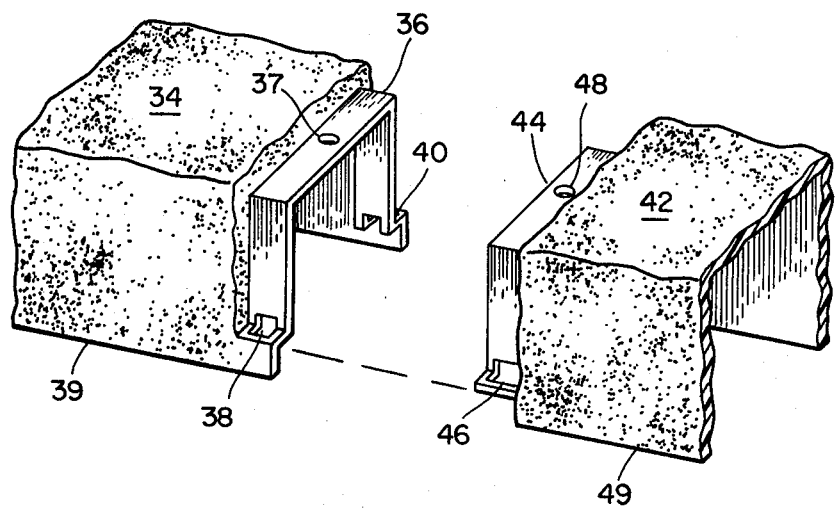
FIG. 6 is an isometric pictorial representation showing the ends of the module arranged for coupling the modules together.

A form of the invention for installation below the ground line is illustrated in FIG. 5, wherein a molded module 3A has blocks 5A and 7A connected by a member 9A. However, blocks 5A and 7A terminate at a base portion 11 as shown in the figure. Connecting member 9A is not as wide as base 11 and forms ledges with the base and on either side thereof, such as the ledge 30.

A slot 32 is formed in connecting member 9A and ledge 30 so as to have a portion 32A in the ledge and a portion 32B in the connecting member. A similar slot (not shown) is formed on the other side of the connecting member as will now be understood.

Plastic molded mortar joint 15 is assembled in the same manner as heretofore described with reference to FIG. 4. However, in this instance the bottoms of legs 19 and 21 and the associated lips 25 and 27 of the mortar joint engage slot portions 32A and 32B on both sides of connecting member 9A, with pin 23 engaging a hole 29A in the top surface of the connecting member to lock the molded mortar joint in place as heretofore explained with reference to FIG. 4.

When module 3A is installed, the ground is excavated to a suitable depth so that the module is, in effect, buried up to the bottom of mortar joint 15 or to ledge 30 as indicated in FIG. 5. This provides for a more permanent type installation as may be required for light industrial usage.

As heretofore noted with reference to FIG. 3, the modules carry opposite male and female ends so that they may be coupled end to end for providing the structure of the invention. This feature is specifically illustrated in FIG. 6.

Thus, a module 34 carries a female right end 36. End 36 is similar in configuration to connecting member 9A shown in FIG. 5 and has like slots 38 and 40 on opposite sides thereof and a centrally disposed hole 37 at its top.

A module 42 carries a male left end 44. End 44 has a slot 46 and another like slot on the other side thereof (not shown) corresponding to slots 38 and 40 on end 36, and a centrally disposed hole 48 corresponding to hole 37.

A base portion 39 of module 34 extends to end 36 and in this respect module 34 differs from module 42, wherein base portion 49 terminates before end 44. The reason for this difference in configuration is evident from FIG. 6 when it is understood that in assembling the structure of the invention, modules 34 and 42 slide together with end 44 fitting into end 36 and for this purpose the external dimensions of end 44 are slightly smaller than the corresponding internal dimensions of end 36. Upon the ends being assembled, slots 38 and 46 match as does slot 40 and its corresponding slot on end 44. Likewise hole 37 on end 36 and hole 48 on end 44 match to provide an assembly which appears like the block and connecting member configuration shown in FIG. 5. Molded mortar joint 15 is assembled astride mating ends 36 and 44, with legs 25 and 27 engaging the matching end holes to lock the assembled modules together and to provide a continuous structural appearance as will now be evident.

It is seen, then, that molded mortar joints 14, 16 and 18 shown generally in FIGS. 1 and 2 and molded mortar joint 15 shown specifically in FIG. 4 may serve the dual purpose of separating module blocks such as the blocks 6, 8, 10, 12 (FIGS. 11 and 12) and locking molded modules such as the modules 34 and 36 (FIG. 6) together end to end. To this end the mortar joints may assume several alternate configurations to be used as desired and which will be now described.

Figure 7:
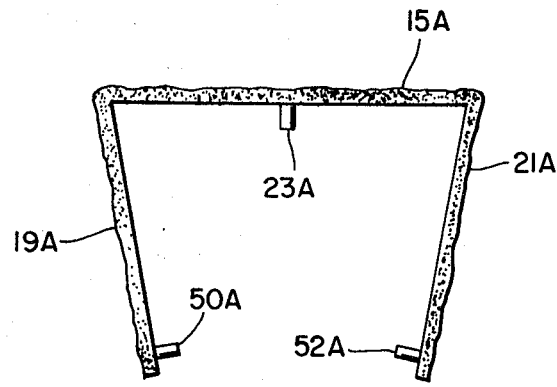
FIGS. 7, 8, and 9 are diagrammatic representations showing alternte molded plastic mortar joints according to the invention.
Figure 8:
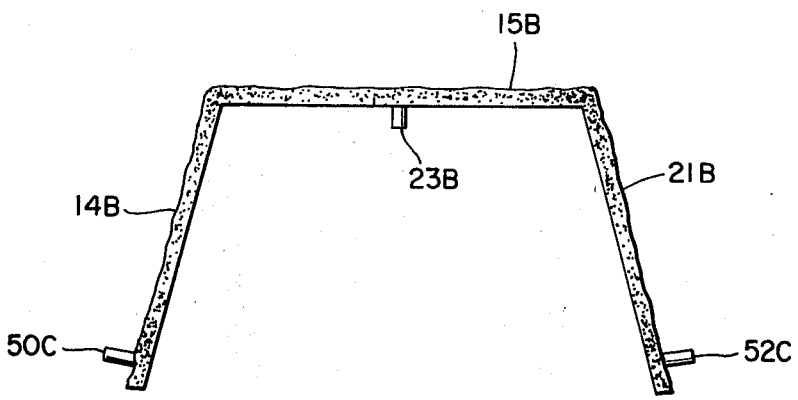
Figure 9:
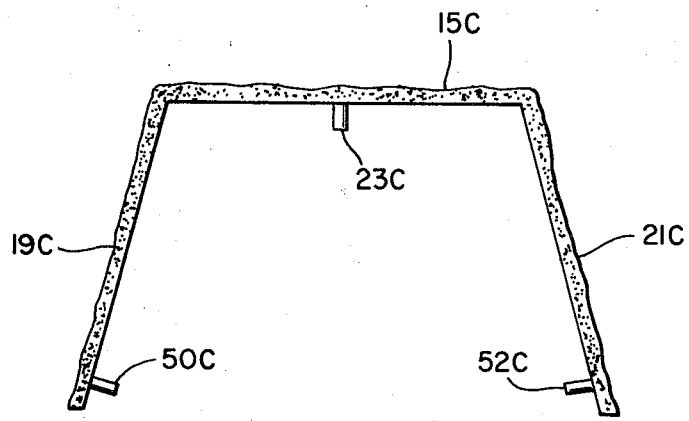

Thus, FIG. 4 illustrates the use of molded mortar joint 15 having legs (19, 21) extending at an acute angle and lips (25, 27) projecting from the legs. FIG. 7 shows a molded mortar joint 15A having legs 19A and 21A extending at an acute angle, and inwardly extending pins 50A and 52A near the bottom of legs 19A and 21A respectively. FIG. 8 shows a molded mortar joint 15A having legs 19B and 21B extending at an obtuse angle and outwardly extending pins 50B and 52B near the bottom of the legs and FIG. 9 shows a molded mortar joint 15C having legs 19C and 21C extending at an obtuse angle, with said legs 19C and 21C carrying inwardly extending pins 50C and 52C near the bottom thereof. Molded mortar joints 15A, 15B and 15C carrying centrally disposed top pins 23A, 23B, and 23C respectively.

Mortar joint 15A is used in a manner similar to that described for mortar joint 15 with reference to FIG. 5. However, when mortar joint 15A is used slot portions 32B on connecting member 9A as shown in FIG. 5 are replaced by holes such as the hole 54 shown in FIG. 10, with just slot portions 32A being carried as shown in the figure. Mortar joint 15A is arranged so that the bottom portions of legs 19A and 21A are received in slot portions 32A, with pins 50A and 52A engaging holes 54 and pin 23A engaging hole 29A as will now be evident.

When the obtuse configuration of mortar joint 15B as shown in FG. 8 is used, legs 19B and 21B are squeezed together so that their ends are received by slot portions 32A, with pin 23B engaging hole 29A and pins 50B and 52C hooking under the respective slot portions 32A. Likewise, when the configuration of FIG. 9 is used, legs 19C and 21C of molded mortar joint 15C are squeezed so that their ends engage slot portions 32A and pins 50C and 52C engages holes 54. Pin 23C thereupon engages holes 29A as the other top pins engage the corresponding connecting member top holes.

Figure 10:
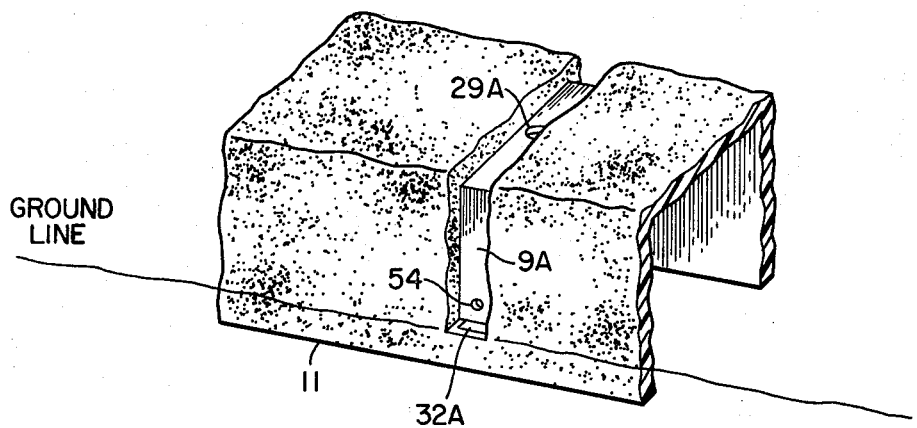
FIG. 10 is an isometric pictorial representation showing a block and connecting member arrangement according to one form of the invention.

It will now be understood that the molded mortar joint configurations shown in FIGS. 7, 8 and 9 may likewise be used to lock coupled modules 34 and 42 (FIG. 6) together. This may be accomplished by modifying module ends 36 and 46 to carry slot portions 32A and holes 54 as shown in FIG. 10.

As heretofore noted with reference to FIG. 1, module 2 may be arranged to support anchoring stakes such as the stakes 20 and 22. This feature of the invention is shown in FIGS. 11A-C and 12A-C.

Thus, FIG. 11A and 12A show blocks such as the blocks 6 and 8 in FIG. 1 joined by a connecting member 60 which is a solid member almost as wide as the blocks and having a centrally disposed hole or well 62. Slots 64 and 66 are disposed at the bottom of the member for retaining molded mortar joints as described with referenc to FIG. 5. Prior to assembly of the molded mortar joint, stake 20 is dropped in well 62 and is retained therein when the mortar joint is snapped in place as heretofore noted.

In FIGS. 11B and 12B, blocks 6 and 8 are shown connected by a solid member 68 which is substantially narrower than the blocks and has a well 70 for receiving stake 20. Slots 72 and 74 are carried at the bottom of member 68 for retaining molded mortar joints as described with reference to FIG. 5.

Alternately, blocks 6 and 8 may be joined by a connecting member 76 as shown in FIGS. 11C and 12C. Thus, connecting member 76 is similar to connecting member 9 shown in FIG. 4 in that it is a solid member extending nearly to the bottom of blocks 6 and 8. Connecting member 76 carries a well 76 extending down the connecting member member, and which well 78 terminates in a hole 80 for receiving stake 20. In this event the molded mortar joints are assembled as shown in FIG. 4, and wherein the mortar joint lips hook under the connecting members at 82 as shown in the figure.

In this connection it is to be noted that when the connecting members have configurations such as shown in FIGURES 11A-11B, 12A-12B, 13A-13B, and the molded mortar joints are assembled astride the connecting members as heretofore noted, the centrally disposed pins such as the pin 23 on molded mortar joint 15 (FIG. 5) fit into the wells 62, 70 and 78 of connecting members 60, 68 and 76 respectively, with the wells providing clearance for the pins as will now be understood.

An important feature of the invention, wherein the structure described is adapted for heavy duty use is illustrated in FIGS. 13A and 13B. The figures show a molded module having a male end 92 and a female end 94 for joining like modules end to end as heretofore described. The module has blocks 96 and 98 connected by a member 100. A block 102 is connected to block 98 by a member 104, a block 106 is connected to block 102 by a member 108 and a block 110 is connected to block 106 by a member 112.

Ends 92 snd 94 carry centrally disposed holes 114 and 116, respectively, on the top thereof and connecting members 100, 104, 108, and 112 carry centrally disposed holes 118, 120, 122 and 124, respectfully, on the top thereof. The centrally disposed holes are for receiving corresponding molded mortar joint pins such as the pin 23 described with reference to FIG. 5. Ends 92 and 94 carry holes 126 and 128, respectively, on both sides thereof and connecting members 100, 104, 108, and 112 carry holes 130, 132, 134 and 136, respectively, on both sides thereof. Holes 126–136 are similar to holes 54 described with reference to FIG. 10 and receive molded mortar joint pins such as the pins 50A, 52A described with reference to FIG. 7. The connecting members extend almost to the bottom of the module blocks and in this respect the feature of the invention is similar to that described with reference to FIGS. 3 and 4.

In this connection it is to be noted that the entire module is vertically extended, i.e., ends 92 and 94, blocks 96–110 and connecting members 114-112 are longer than is the case in other embodiments of the invention. Additionally, the lower portions of the blocks carry surations or saw teeth 141, 143, 145, 147 and 149 and clusters of perforations 140, 142, 144, 146, 148 extending through the surations and blocks for purposes as will be hereinafter described. In order to provide strength so that the module is suitable for the purposes intended, ribs 150, 152, 154, 156 and 158 extend transversely across corresponding blocks as shown in the figure.

FIGS. 14 and 15 show alternate molded mortar joints which may be used with the embodiment of the invention shown in FIGS. 13A–13B. Thus, molded mortar joint 160 in FIG. 14 is of the previously described "acute" type and carries a centrally disposed top pin 162 and side pins 164 and 166 for locking the joints in module ends and connecting members as heretofore described. Molded mortar joint 168 in FIG. 15 is also of the "acute" type and carries a centrally disposed top locking pin 170 and side lips 172 and 174 for fitting under the connecting member as described with reference to FIG. 4. The legs of molded mortar joints 160 and 168 carry serrations or saw tooth 176 for a purpose to be hereinafter described.

In installing structures including molded modules 90 the modules are first coupled end to end and molded mortar joints such as the mortar joints 14 and 15 are snapped over the coupled ends for locking purposes and snapped over the connecting members to provide a continuous appearance as heretofore described. Module 90 is vertically extended so that when installed the ground line is just above holes 126, 128 and 130–136 as best shown in FIG. 13A. To this end an excavation is made to the appropriate depth and filled with suitable road material such as wet asphalt or cement, after which the structure is laid in the wet road material. The wet road material seeps into the perforations in clusters 140–148 and adheres to serrations 141–149 so that when the road material dries the structure is virtually immovable. The molded mortar joints become integral with the road material by virtue of the material adhering to saw teeth 176 as will now be evident.

In molding the modules and mortar joints heretofore described conventional methods well known in art may be used. It will suffice to say for purposes of the present invention that a metal female mold having a cavity with the module impression and a metal male mold which is a module facsimile are used. When the male and female molds are in molding engagement a clearance exists therebetween to permit the flow of molten plastic and to thereby provide module walls.

With the male and female molds so engaged, the assembled mold is arranged in conventional thermoplastic injection molding equipment. The shape of the modules as defined by the mold is provided by injecting molten plastic in the mold, and which plastic upon cooling and hardening takes the form of the finished module.

Similarly, a mold having male and female portions in molding engagement is used or molding the respective mortar joints by the injection molding process well known in the art.

In molding the components of the invention as outlined above it is to be understood that the finished molded product simulates a conventional stone or masonry structure not only in shape and appearance but in color and texture as well. The molded modules and mortar joints may simulate brick, granite or other masonry materials as the case may be, or may even simulate other articles such as railroad tie structures which are used for the landscaping purposes intended. The molded mortar joints may have flat, concave or convex surfaces as may be desired and may be a different color than the blocks for a realistic appearance.

In summation then, the invention as described provides plastic molded landscape edging and border structures which are more economical to manufacture, easier to install and satisfactorily durable when compared to masonry structures of the type now known in the art.

The structures includes modules coupled end to end, and which modules include molded plastic block and mortar joint assemblies. The molded mortar joints are effectively used for separating module blocks and for locking the coupled modules together to give a continuous uniform masonry appearance over the length of the structure. The structure may be installed on the ground line as may be desired by "do-it-yourself" private home owners, or a more durable installation may be provided by using the embodiments of the invention adapted for installation below the ground line. A heavy duty embodiment of the invention features anchoring the structure in road material as may be desired for commercial installations.

Although several embodiments of the invention have been illustrated and described in detail, it is to be expressly understood that the invention is not limited thereto. For example, the modules may be longer, shorter, and higher or lower than those illustrated. Moreover, the modules may be curved to form a radius structure and modules may be provided with closed ends to terminate the structure. Various changes may also be made in the design and arrangement of the parts without departing from the spirit and scope of the invention as the same will now be understood by those skilled in the art.

What is claimed is:

1. A plastic molded landscape edging and border structure, comprising:
    a plurality of molded plastic modules;
    each of the modules having a male end and an opposite female end;
    the modules arranged so that the male end of one module engages the female end of another module for coupling the modules together;
    plastic molded mortar joint members arranged in relation to the engaged module ends for locking the coupled modules together; and
    the molded modules and mortar joints cooperating to provide a continuous structure having a realistic masonry appearance.

2. A structure as described by claim 1, wherein:

the modules include a plurality of block members arranged adjacent to each other with spaces therebetween;

other molded plastic mortar joints are arranged in the spaces between the adjacent block members; and the block members and other molded mortar joints cooperate to provide a continuous module having a realistic masonry appearance.

3. A structure as described by claim 2, including:

connecting members within the spaces for connecting adjacent block members; and the connecting members arranged for supporting the other molded mortar joints in the spaces.

4. A structure as described by claim 3, wherein:

the block members and connecting members terminate in a base extending below said members for installation of the structure below a ground line, the ground line being at the top of the base;

the connecting members have top surface and opposite side surfaces, said side surfaces adjoining the top of the base and forming shelves therewith;

slots are carried in the side surfaces and the shelves formed thereby with the base, and a hole is carried in the top surface;

the other mortar joints have an inverted U-shape with a top and a pair of legs extending downward therefrom, and a pin extending downward from the top; and the other mortor joints are disposed astride the connecting members, with the mortar joint legs engaged in the slots and the pin engaged in the hole carried by the top surface for retaining said mortar joints in the spaces between the block members.

5. A structure as described by claim 4, wherein:

the pair of mortar joint legs extend downward from the mortar joint top at an acute angle and are deflectable away from each other; and the legs are deflected when the other mortar joints are disposed astride the connecting members for exerting a retaining force when the legs are engaged in the slots.

6. A structure as described by claim 5 wherein:

the legs of the other mortar joints have lips at the ends thereof for engaging the slots in the side surfaces of the connecting members.

7. A structure as described by claim 4, wherein:

the pair of mortar joint legs extend downward from the mortar joint top at an obtuse angle and are deflectable toward each other; and the legs are deflected when the other mortar joints are disposed astride the connecting members for exerting a retaining force when the legs are engaged in the slots.

8. A structure as described by claim 7, wherein;

the legs of the other mortar joints engage the slots in the shelves formed by the side surfaces and the adjoining top of the base.

9. A structure as described by claim 3, wherein:

the block members and the connecting members terminate in a base extending below said members for installation of the structure below a ground line, said ground line being at the top of the base;

the connecting members have a top surface and opposite side surfaces, said side surfaces adjoining the top of the base and forming shelves therewith;

holes are carried in the side surfaces and slots are carried in the shelves formed thereby with the base, and a hole is carried in the top surface;

the other mortar joints have an inverted U-shape and have a top and a pair of legs extending downward therefrom, and pins extending inwardly from the legs and a pin extending downward from the top; and the other mortar joints are disposed astride the connecting members, with the mortar joint legs engaged in the slots, the leg pins engaged in the side surface holes and the top pin engaged in the top surface hole for retaining the mortar joints in the spaces between the blocks.

10. A structure as described by claim 9, wherein:

the pair of mortar joint legs extend downward from the mortar joint top at an acute angle and are deflectable away from each other; and the legs being deflected when the other mortar joints are disposed astride the connecting members for exerting a retaining force when said legs are engaged in the slots and the leg pins are engaged in the side surface holes.

11. A structure as described by claim 9, wherein:

the pair of mortar joint legs extend downward from the mortar joint top at an obtuse angle and are deflectable toward each other; and the legs being deflected when the other mortar joints are disposed astride the connecting members for exerting a retaining force when said legs are engaged in the slots and the leg pins are engaged in the side surface holes.

12. A structure as described by claim 3, wherein:

the connecting members terminate just above the bottom of the block members for installation of the structure on a ground line, the ground line being at the bottom of the block members;

the connecting members have a top surface and opposite side surfaces, said side surfaces form channels with the bottom of the blocks, and a hole carried in the top surface;

the other mortar joints have an inverted U-shape and have a top and a pair of legs extending downward therefrom, and a pin extending downward from the top; and the other mortar joints are disposed astride the connecting members, with the mortar joints engaged in the channels for retaining said mortar joints in the spaces between the block members.

13. A structure as described by claim 12, wherein:

the pair of mortar joint legs extend downward from the mortar joint top at an acute angle and are deflectable away from each other; and the legs have lips at the ends thereof and are deflected when the other mortar joints are disposed astride the connecting members for exerting a restraining force when the lips are engaged in the channels.

14. A structure as described by claim 1, wherein:

the male ends of the modules have a pair of side surfaces and a top surface, the side surfaces carrying a centrally disposed hole;

the female ends of the modules have a corresponding pair of side surfaces and a corresponding top surface, the side surfaces carry slots and the top surface carries a centrally disposed hole;

the side surface slots and the top surface holes on the male and female ends being aligned when said ends are coupled;

the mortar joints have an inverted U-shape and have a top and a pair of legs extending downward therefrom, and a pin extending downward from the top; and the mortar joint legs engage the aligned side surface slots and the mortar joint pin engages the aligned centrally disposed holes for locking the coupled modules together.

15. A structure as described by claim 14, wherein:

the pair of mortar joint legs extend downward from the mortar joint top at an acute angle and are deflectable away from each other; and the legs have lips at the ends thereof and are deflected when the mortar joints are disposed astride the connecting members for exerting a retaining force when the lips are engaged in the slots for locking the coupled modules together.

16. A structure as described by claim 3, including:

selected connecting members having wells extending longitudinally therethrough; and stakes carried in the wells and extending through the module for anchoring the module in the ground.

17. A structure as described by claim 3, wherein:

the modules each have a base extending substantially below the block members;

the connecting members within the spaces for connecting adjacent block members extend with the base;

the other mortar joints have portions extending with the base and supported in the spaces between the block members by the extended connecting members; and said base, extended connecting members and extended mortar joint portions adapted for being disposed in a bed of wet road material for installation of the modules below a ground line, said modules becoming integral with the road material upon drying thereof.

18. A structure as described by claim 17, wherein:

the base includes perforations through which the wet road material seeps and serrations to which the wet road material adheres to anchor the base in the road material when said material dries.

19. A structure as described by claim 18, wherein:

the extended mortar joint portions include external serrations which trap the road material for anchoring the mortar joint portions therein.

* * * * *